United States Patent [19]
Brady

[11] 3,922,508
[45] Nov. 25, 1975

[54] CODED TELEPHONE LINE TESTING EQUIPMENT

[75] Inventor: Brian B. Brady, Minneapolis, Minn.

[73] Assignee: Magnetic Controls Company, Minneapolis, Minn.

[22] Filed: Jan. 14, 1974

[21] Appl. No.: 432,806

[52] U.S. Cl. .......................... 179/175.3 R; 179/2 A
[51] Int. Cl.² .......................... H04B 3/46
[58] Field of Search ..... 179/175.3 R, 84 SS, 84 VF, 179/2 A; 178/66 R, 66 A, 69.5 R; 340/146.1 C, 146.1 D

[56] References Cited

UNITED STATES PATENTS

| | | | |
|---|---|---|---|
| 3,371,165 | 2/1968 | Earle et al. | 179/175.3 R |
| 3,443,032 | 5/1969 | Mitsui | 179/A |
| 3,624,528 | 11/1971 | Adlhock | 178/66 R |
| 3,739,107 | 6/1973 | Spencer | 179/175.3 R |
| 3,790,723 | 2/1974 | Stewart | 179/175.3 R |
| 3,814,839 | 6/1974 | Lubarsky | 179/175.3 R |
| R27,810 | 11/1973 | Buehrle | 178/66 |

*Primary Examiner*—Douglas W. Olms
*Attorney, Agent, or Firm*—Neil B. Schulte

[57] ABSTRACT

Telephone line testing equipment in which a series of alternating current tone pulses are transmitted from the central office along the line to a sensing means placed at a remote point in the circuit. The series of pulses are transmitted in a coded sequence. The sensing means receives the pulse sequence, decodes it, and connects the telephone line to suitable loopback testing circuits if the proper code is received.

7 Claims, 2 Drawing Figures

CODED TELEPHONE LINE TESTING EQUIPMENT

BACKGROUND OF THE INVENTION

This invention relates to an improvement in telephone line testing equipment of the type described in two prior copending patent applications titled "Telephone Looptest System" filed on Jan. 12, 1973 by Russell G. Cox, Ser. No. 323,140 now U.S. Pat. No. 3,843,848 and "Telephone Line Testing Equipment" filed on Sept. 14, 1973 by Russell G. Cox et. al., Ser. No. 397,268 now abandoned. The subject matter of these prior copending patent applications relates to a highly effective method of remotely testing telephone lines by passing alternating current signals down the line from a central office and detecting that alternating current at some remote point in the circuit with a suitable pickup. The sensed AC signal is used to operate a switch so as to connect the telephone lines together to form a loopback circuit through which the lines up to that remote point may be tested. The details of these circuits are explained fully in the aforementioned patent applications which are hereby made a part of this application through incorporation by reference. Although these prior inventions work well there exist additional requirements which can be more suitably satisfied with the invention proposed herein.

When telephone circuits are utilized in conjunction with computers and other data processing customer equipment to transmit information therefrom it is more common to use a four wire telephone system rather than the two wire system shown in the aforementioned prior patent applications. It is also common to connect a plurality of different sets of equipment on a single circuit. It would be desirable if each of these plurality of different sets of equipment could be looped back independently of the others. Furthermore, with data processing equipment there is likely to be a great deal more AC tone signals on the telephone lines of the type which could accidently activate the loopback feature. It is therefore desirable to provide greater security with respect to the type of signals that will activate the loopback. The present invention accomplishes this end.

BRIEF SUMMARY OF THE INVENTION

Briefly, my invention contemplates applying a series of AC tone bursts in a coded sequence to the telephone circuit in contradistinction to the one or two AC tone bursts proposed in the above mentioned patent applications. These AC tone bursts are detected in a manner similar to that described in the earlier patent applications. However, suitable logic circuits are disclosed to receive, analyze and decode the sequence of pulses to determine whether or not the code applied to the piece of equipment or portion of the circuit in question. If a match is made, a loopback circuit is completed for that piece of equipment only and the rest of the circuit is not affected. It may therefore be seen that it is an object of this invention to provide an improved telephone circuit testing system having increased flexibility and increased security. It is a further object of my invention to provide a system wherein a plurality of different sets of equipment can utilize the same telephone lines while only a single piece of equipment is tested for any given coded signal. Further objects and advantages will become apparent from the following detailed description and drawings.

DESCRIPTION OF THE PREFERRED EMBODIMENT

Figure 1:
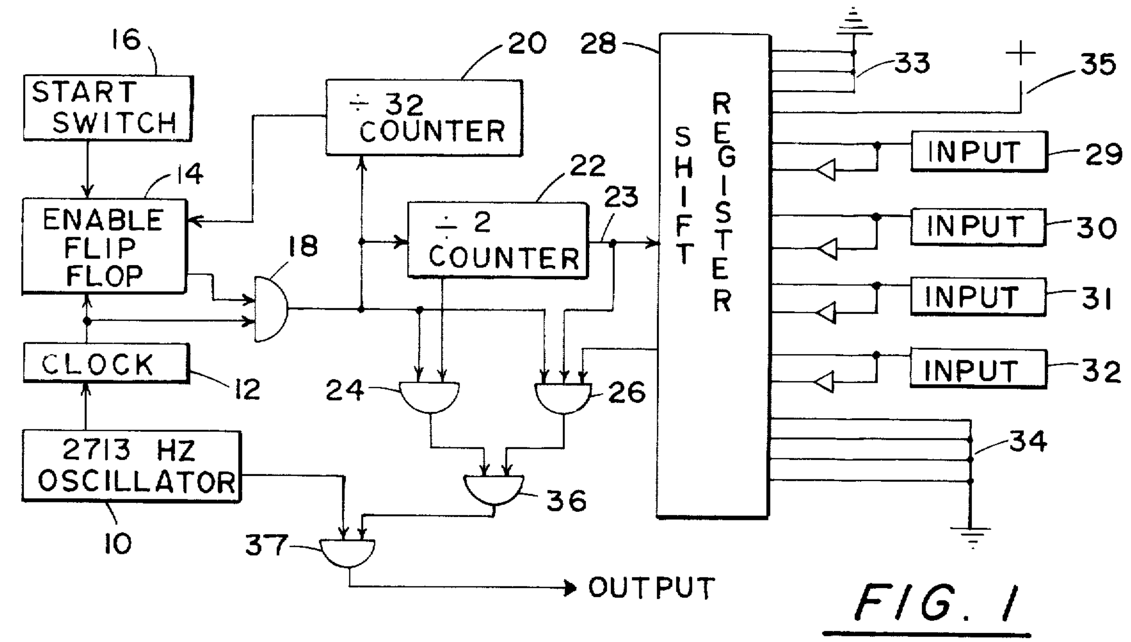
FIG. 1 is a schematic circuit diagram showing the central office master circuit which generates a series of coded pulses to operate the loopback circuits.

In FIG. 1 it may be seen that the series of coded sequence AC tone bursts are produced by having a logic circuit periodically open a gate 37 to pass therethrough a 2,713 hertz signal from an oscillator 10 to the output. The particular code sequence for opening the gate 37 is determined by setting a series of four inputs 29, 30, 31 and 32 either positive or negative so as to program the output of a shift register 28. The overall circuit operates as described hereinafter.

A clock 12, which if desired may be driven by oscillator 10 as shown in FIG. 1, produces a series of clock pulses at a predetermined frequency.

Although many different frequency rates may be chosen, it has been found to be advantageous to use a low rate for the purposes intended here since a low frequency is not likely to be confused with data processing signals. Accordingly, the output of clock 12 has been chosen to be about 5 hertz in the preferred embodiment. The signal from clock 12 is blocked until an AND gate 18 is opened by an enable flip-flop circuit 14. Enable circuit 14 is operable in response to a start switch 16. When switch 16 is activated, enable circuit 14 waits for the next pulse from clock 12 and in response thereto opens gate 18 so as to pass the clock pulses through to the remainder of the circuit. These pulses are received by a counter 20 which can be thought of as a divide by 32 circuit. Counter 20 counts up the pulses until 32 pulses have been received and then signals enable circuit 14 to again turn off. In this way only a predetermined number of pulses can be transmitted.

In the preferred embodiment the code takes the form of a series of sixteen clock pulses which may or may not have interspersed therebetween data pulses. The clock pulses are generated from an AND gate 24 by presenting thereto the original clock pulse from gate 18 and a comparison 2½ hertz signal from a divide by two counter 22. These clock pulses pass through OR gate 36 to operate AND gate 37 and gate out a series of AC tone bursts at 2,713 hertz from oscillator 10. Divide by the two counter 22 also produces a second 2½ hertz signal of reverse polarity on the line 23 which is also combined with the clock pulse in AND gate 26 to produce the data output of the same frequency as the clock but 180° out of phase therewith so as to be interspersed in the spaces between the clock pulses. AND gate 26 only operates if a signal is also received from shift register 28. The 2½ hertz clock pulses on line 23 are used to operate shift register 28 which has sixteen sequential positions therein. As can be seen in FIG. 1 the first three inputs 33 are grounded (that is they have a logical "zero" input) so that no data pulses are ever transmitted following the first three clock pulses. The fourth input 35 is connected to a positive input (that is it has a logical "one" input) to as to transmit a data pulse after the fourth clock pulse. This ensures that the apparatus at the receiving end will know that the code sequence has begun. The next eight positions are comprised of the inputs from inputs 29, 30, 31 and 32 and also the inverse signals therefrom. It is important to note that for every "one" a "zero" is transmitted and alternatively for every "zero" input a "one" is transmitted. This provides additional security in the coding system during the decoding of the signal at the receiver end. In the preferred embodiment shown the remaining four outputs are grounded so as to provide zero data bits.

Figure 2:
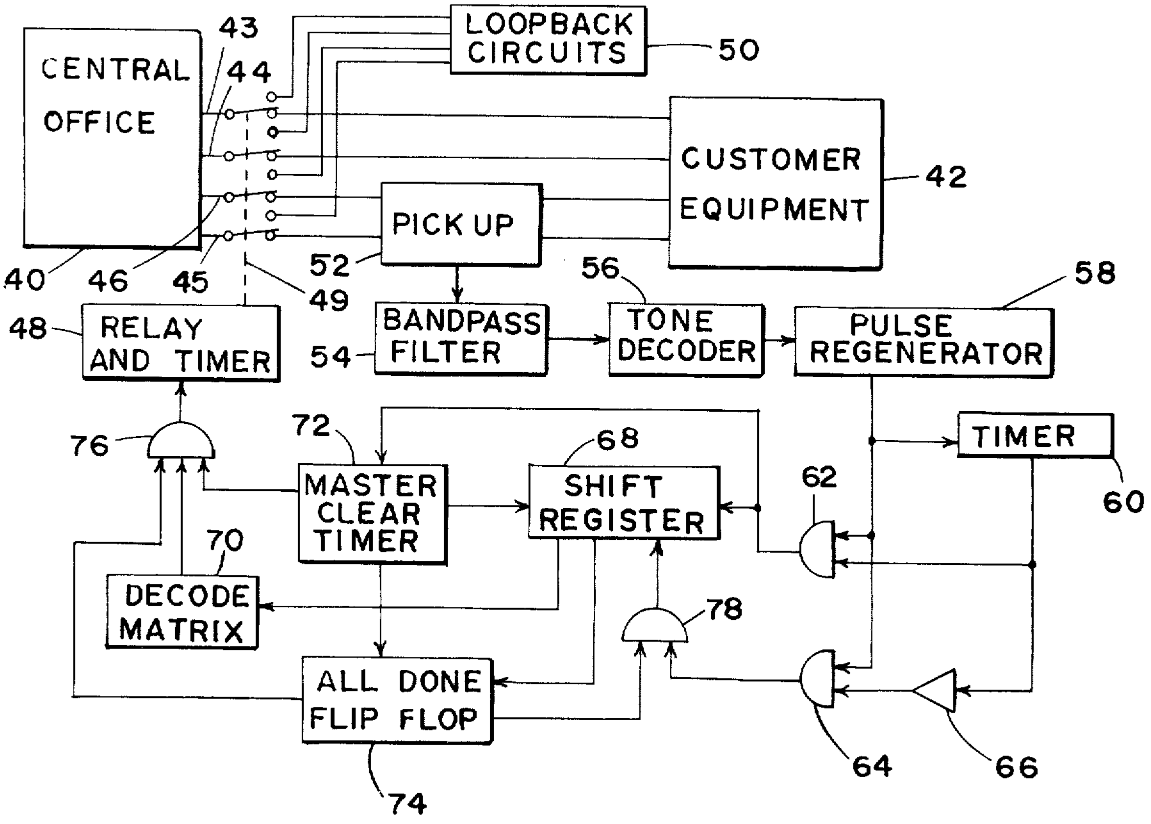
FIG. 2 is a schematic circuit diagram showing the receiving circuits positioned immediately before each set of customer equipment for determining if the coded sequence of pulses is addressed to that particular piece of customer equipment and completing the loopback circuit in accordance therewith.

In FIG. 2 the receiving and decoding apparatus is shown. The telephone circuit between the central office 40 and the customer equipment 42 is shown by four wires 43, 44, 45 and 46. In general lines 43 and 44 comprise the transmit wires while lines 45 and 46 comprise the receiving wires. All four wires are provided with switches operated by a suitable connection shown as a dashed line 49 from the relay and timer 48. Operation of relay 48 connects lines 43 and 44 to lines 45 and 46 through suitable loopback circuits 50 which may include amplifiers, or test impedances or both. Relay 48 is operated in response to the reception of the coded signal by pickup 52. Pickup 52 may comprise an inductive pickup or any other pickup suitable to detect signals on the lines or circuit. The details of operation of a pickup such as pickup 52 may be seen by reference to the above mentioned prior copending patent applications or other prior art well known to those skilled in the art. The signals from pickup 52 are presented to a bandpass filter 54 which is chosen to pass primarily signals of the 2,713 hertz frequency. Each of the 2,713 hertz tone bursts is then presented to a tone decoder 56 which may comprise, for example, a phase locked loop tone decoder of the type described in the above mentioned copending patent applications. The output of decoder 56 comprises a series of coded sequence pulses each pulse of which corresponds to one of the AC tone bursts on the telephone circuit. A pulse regenerator 58 is used to reproduce the pulses in a better defined manner to improve the operation of the circuit. As described with respect to FIG. 1 these pulses comprise a series of sixteen clock pulses of 2½ hertz frequency which may or may not have data bits interspersed therebetween at the various possible locations. The clock frequency is separated from the data bits by presenting the signal to a pair of AND gates 62 and 64 in conjunction with the signal from a timer 60. Timer 60 is operated by the clock pulses only due to the fact that the first three pulses received are always clock pulses, shift register 28 being grounded at point 33.

Timer 60 stays on for a predetermined interval of time after each clock pulse which interval is longer than the interval of time during which the data bit will appear. Consequently, when the output of timer 60 is inverted by an inverting amplifier 66 and presented to gate 64 it holds gate 64 off after each clock pulse for the interval during which the data bit is received. As a result the output of gate 64 may comprise only the clock signals. These clock signals are directed through a gate 78 to shift register 68 so as to move shift register 68 along in unison with shift register 28 in FIG. 1. Gate 62, however, does not receive an inverted signal from timer 60 and therefore it is held open during the time which the data bits are received from pulse regenerator 58. Consequently, the output of gate 62 represents the data bits which are loaded serially in the shift register 68 in a manner well known to those skilled in the art. The first data bit received initiates master clear timer 72 timing for a predetermined interval during which the disabling function of the master clear timer 72 is removed. This allows data to enter shift register 68. The output of gate 62 includes no clock pulses since timer 60 is chosen to be of the type that activates upon the cessation of the clock pulse from pulse regenerator 58. Thus, the clock pulses have completed their cycle at gate 62 when timer 60 opens gate 62 to make it ready to receive the data bit.

When shift register 68 has received the entire code sequence a decode matrix 70 applies a signal to gate 76 if and only if the proper code for this particular piece of customer equipment has been received. The decode matrix 70 comprises a plurality of gates connected together in a combination dependent upon the selected code in a manner well known to those skilled in the art.

When shift register 68 has been completely loaded a signal is presented to an "all done" flip-flop 74 which then opens gate 76 to allow any signal from decode matrix 70 to pass through to relay and timer 48. Flip-flop 74 also closes gate 78 to prevent any additional clock pulses from moving shift register 68. The system remains in this state until the master clear timer 72 completes its timed cycle at which time the disabling function of master clear timer 72 is restored. This resets flip-flop 74, disables gate 76, and blocks the movement of data into register 68. On a subsequent message the reception of the first data pulse again initiates the master clear timer circuit 72 for a chosen interval which enables shift register 68 to start storing data and also enables flip-flop 74 to be set by shift register 68.

Relay 48 includes a timer built therein which holds the relay in the loopback position for a predetermined period of time during which suitable loopback tests may be performed. This operation is similar to that described in the above mentioned patent applications and is therefore not further described here.

It may therefore be seen that an improved telephone circuit testing scheme is provided wherein a high degree of security combined with a special coding technique permits several different sets of equipment to be connected to different points on the same line or circuit but tested independently.

This basic concept is accomplished herein with suitable shift registers and logic circuitry which of course could be modified by those skilled in the art without departing from the spirit and scope of the invention. I, therefore, intend to be limited only by the appended claims.

I claim:

1. Apparatus for the testing of a communication circuit from one point to another remote point comprising in combination:

means for applying a coded series of pulses to the circuit, said pulses comprising a plurality of clock controlled evenly spaced pulses with shift register controlled code pulses between some of the evenly spaced pulses;

sensing means in the circuit at the remote point for sensing said coded series of pulses;

decoding means connected to said sensing means for receiving said series of pulses and decoding code has been received; and switching means connected to said decoding means operable to connect a loopback circuit to said communication circuit in response to the reception of the proper code said communication circuit including two pairs of wires and said switching means comprising a switch operable to connect said loop-back circuit from one pair to the other pair and disconnect the remaining portion of the circuit.

2. The apparatus of claim 1 in which said means for applying comprises a clock means adapted to transmit said evenly spaced pulses and a shift register adapted to transmit said code pulses between some of the evenly spaced pulses in a predetermined sequential code.

3. The apparatus of claim 2 in which said decoding means comprises a shift register and decode matrix connected to process the code pulses received between the clock pulses and activate said switching means if the pulses are received in the proper coded sequence.

4. The apparatus of claim 1 in which said pulses each comprise an alternating current tone signal.

5. The apparatus of claim 3 in which said pulses each comprise an alternating current tone signal.

6. The apparatus of claim 5 in which said sensing means comprises a pickup on one of said pairs of wires connected to a filtering means and a tone decoding means to produce single pulses in response to each of the alternating current pulses, and also a pair of AND gates connected to said tone decoding means and to a timer means which timer is connected to said tone decoding means so as to pass clock pulses through one AND gate and data pulses through the other gate.

7. The apparatus of claim 1 in which said sensing means comprises a pickup on one of said pairs of wires connected to a filtering means and a tone decoding means to produce single pulses in response to each of the alternating current pulses, and also a pair of AND gates connected to said tone decoding means and to a timer means which timer is connected to said tone decoding means so as to pass clock pulses through one AND gate and data pulses through the other gate.

* * * * *

UNITED STATES PATENT OFFICE

CERTIFICATE OF CORRECTION

Patent No. 3,922,508 Dated November 25, 1975

Inventor(s) Brian B. Brady

It is certified that error appears in the above-identified patent and that said Letters Patent are hereby corrected as shown below:

Column 4, line 65, after "decoding" insert -- the arrangement thereof to determine if the proper- --.

Signed and Sealed this

*sixteenth* Day of *March 1976*

[SEAL]

*Attest:*

RUTH C. MASON
*Attesting Officer*

C. MARSHALL DANN
*Commissioner of Patents and Trademarks*